United States Patent [19]

Monteillet

[11] 4,373,832
[45] Feb. 15, 1983

[54] CONNECTING ROD OR SIMILAR OBJECT HAVING A HOLLOW BODY

[75] Inventor: Denis Monteillet, Saint Barthelemy de Vals, France

[73] Assignee: Societe Anonyme de Recherches de Mecanique Appliquee, Saint Vallier sur Rhone, France

[21] Appl. No.: 204,766

[22] Filed: Nov. 6, 1980

[30] Foreign Application Priority Data

Nov. 8, 1979 [FR] France ................................. 7928012

[51] Int. Cl.³ .............................................. F16B 2/14
[52] U.S. Cl. .................................... 403/374; 403/267
[58] Field of Search ............... 403/267, 370, 371, 374, 403/275

[56] References Cited

U.S. PATENT DOCUMENTS 3,638,979  2/1972  Francois et al. ..................... 403/281
4,127,344 11/1978  Kwiatkowski ....................... 403/374

FOREIGN PATENT DOCUMENTS 2619257 11/1976  Fed. Rep. of Germany ...... 403/370
  69951  8/1930  Sweden .............................. 403/374
 965314  7/1964  United Kingdom ................ 403/374

*Primary Examiner*—Andrew V. Kundrat
*Attorney, Agent, or Firm*—Young & Thompson

[57] ABSTRACT

A connecting rod comprises a fibrous tubular body with a connecting end member at one end. The end member is screwed into a separate brace member having a conical external surface about which is mounted a radially expansible member having a corresponding conical internal surface. The expansible member has closed longitudinal slots and a cylindrical external surface of diameter equal to the internal diameter of the body. A cap is screwed on the bracing member and has an internal diameter equal to the external diameter of the body, which is received between the cap and the bracing member.

3 Claims, 1 Drawing Figure

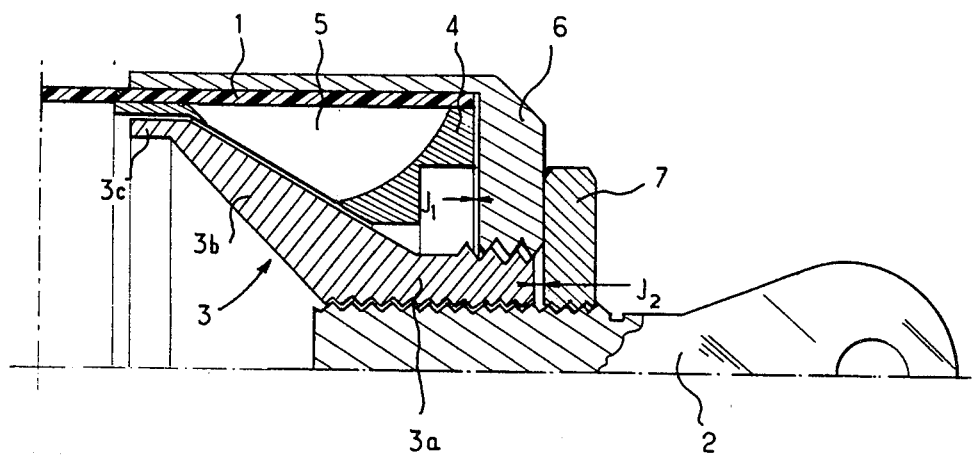

CONNECTING ROD OR SIMILAR OBJECT HAVING A HOLLOW BODY

BACKGROUND OF THE INVENTION

1. Field of the Invention

The present invention relates to a connecting rod or similar object for transmitting compressive or tensile stress, by transforming all or part of such stress into shearing-compressive stress, or even simple compression, comprising a fibrous tubular body, a connecting end member at one end of this body, a brace member which is rigid with the end member and comprises a truncated conical section on the exterior, an element which can be radially expanded and has a frusto-conical section with the same conicity as the frusto-conical section of the brace member, having an external diameter substantially equal to the internal diameter of the body of the connecting rod and mounted on the brace member and a cap with an internal diameter substantially equal to the external diameter of the tube.

2. Description of the Prior Art

Connecting rods or similar objects having a hollow body formed of fibres, for example of carbon fibres, and whose ends are fitted with connecting end members are already known.

In the prior art, a connecting rod of this type was formed by disposing a series of strips of fibrous material impregnated with resin on a mandrel of thermofusible material and also on the end member placed at the ends of the mandrel and by then proceeding to heat the resin. During this heating, the mandrel disintegrates or melts and only the body of the connecting rod remains.

It has recently been proposed to form the body of the connecting rod from man-made fibres. However, fixing the end members at the ends of the tube presents difficulties. This fixing can be practically performed only by adhesion. In order that this adhesion withstands to a sufficient degree both tensile stress and heat shock under load, it is necessary, in the present state of the art, to form the ends from titanium which is an expensive and rare metal. In addition, the form of these ends must be studied in detail (hence the complicated manufacture and machining) in order to enable the formation of an efficient mechanical anchorage independent of adhesive securement.

U.S. Pat. No. 3,638,979; discloses a force transmission device comprising a tube of fibrous material on one end of which a connecting end is secured. This end member is an integral part of a frusto-conical element; a number of wedges whose interior faces have the same conicity as the brace member and whose external faces are together cylindrical, with an outer diameter substantially equal to the inner diameter of the tube, are mounted on the brace member. A cap with an internal diameter substantially equal to the external diameter of the tube is mounted on the end of this tube.

This force transmission device does not resist compression well which is liable to result in the separation of the end member and slipping of the fibrous tube, which damages this tube.

SUMMARY OF THE INVENTION

An object of the present invention is to provide a connecting rod or similar object of the type indicated above, which is able to resist both compression and traction or tension.

In accordance with the invention, the connecting end member is independent of the brace member and comprises a threaded section which is screwed into a threading of the brace member. The expansible element is formed by a single annular member comprising longitudinal slots closed at both ends, and the cap is screwed on the brace member and if necessary adhesively secured to the tubular body.

When the connecting rod is utilized, the adhesive is subjected to relatively low shearing stresses such that the cap remains adherent to the tubular body even if the cap is not made of titanium. In some cases adhesive securement may be omitted.

BRIEF DESCRIPTION OF THE DRAWING

The accompanying drawing shows a half-section of a connecting rod constituting a preferred embodiment of the invention.

DESCRIPTION OF THE PREFERRED EMBODIMENT

The connecting rod comprises a body 1 which is composed of a section of a tube made of fibres, for example of agglomerated carbon, and at one end of which is mounted an end member 2 formed from a metal, for example from steel or an aluminum alloy.

The end of the end member 2 is threaded. There is mounted at this end a brace member 3 comprising a cylindrical section 3a which is screwed so as to have play on the end of the end member 2 and has external threading, a section 3b which extends from the section 3a and is frusto-conical at its exterior, and a section 3c which is cylindrical and extends from the section 3b.

An expansible member 4 is mounted on the brace member 3 and is internally frusto-conical, with the same conicity as the section 3b of the brace member 3, and externally cylindrical with a diameter substantially equal to the internal diameter of the tube 1. The expansible member is provided with longitudinal slots 5 closed at both ends. An outer cap 6 whose skirt has an internal diameter substantially equal to the external diameter of the tube 1 is screwed so as to have play on the brace member 3 and, if necessary, can be adhered to the tube 1. A nut 7 screwed on the end member so as to have play locks the cap.

In order to fix the end member 2 to the tube 1, the brace member 3 and the expansible member 4 are positioned on the end member and the assembly is inserted in the tube 1. Then the cap 6 is screwed onto the brace member 3 in such a way that the expansible member 4 is in contact with the brace member 3 and the cap 6. The tube 1 preferably has been previously positioned in such a way that there is a clearance $J_1$ between the base of the cap 6 and the end face of the tube 1. In addition, the base of the cap 6 has a thickness such that its outer face is at a certain distance $J_2$ from the outer face of the brace member 3, which distance $J_2$ is larger than the play $J_1$.

Finally the nut 7 is tightened.

When the connecting rod is compressed, the adhesive between the tube 1 and the skirt of the cap 6 is subjected to shearing stress, but this stress is limited since the tube 1 almost immediately comes to rest against the base of the cap.

When the end member 2 is subjected to tensile stress firstly the play between the end member 2 and the cap 6 is taken up, then tensile stress is transmitted to the expansible member 4, such that the latter, compressed between the brace member and the cap, expands radially and anchors itself in the wall of the tube 1. In this way the expansible member carries the tube 1 along, which comes to rest against the base of the cap 6. Again, the shearing stress, to which the adhesive between the tube and the skirt of the cap is subjected, is only very slight, or even non-existent, which enables this type of assembly to be used without adhesive securement. In other words, the tensile stress is transformed totally or partially into shearing-compressive stress, or even simple compression.

The present invention, of course, should not be considered to be restricted to the embodiment described and illustrated, but, on the contrary, all variants thereof are covered.

I claim:

1. A connecting rod for transmitting longitudinal stress, comprising a fibrous tubular body having internal and external diameters and a first end, a connecting end member at said first end of said body, a brace member having internal screw threads and comprising an external frusto-conical section, a radially expansible element having an internal frusto-conical section with the same conicity as said frusto-conical section of said brace member, having an external diameter substantially equal to said internal diameter of said body, and being mounted on said brace member, and a cap surrounding said first end of said tubular body with an internal diameter substantially equal to said external diameter of said body, said connecting end member being independent of said brace member and having external screw threads engaged with said internal screw threads of said brace member, said expansible element comprising an annular member having longitudinal slots therethrough closed at both ends, and said cap being screwed on said brace member.

2. A connecting rod as set forth in claim 1, wherein said cap is adhesively secured to said body.

3. A connecting rod as set forth in claim 1, wherein said brace member has an end spaced longitudinally from an end face of said cap by a spacing and said first end of said body is longitudinally spaced from said cap by a clearance, said spacing being larger than said clearance.

* * * * *